US010802511B2

(12) United States Patent
Forrestal et al.

(10) Patent No.: US 10,802,511 B2
(45) Date of Patent: Oct. 13, 2020

(54) THERMOSTATIC MIXING VALVE WITH DISINFECTING FACILITY

(71) Applicant: RELIANCE WORLDWIDE CORPORATION (AUST.) PTY. LTD., Melbourne, Victoria (AU)

(72) Inventors: David Peter Forrestal, Melbourne (AU); Gary Hay, Melbourne (AU)

(73) Assignee: Reliance Worldwide Corporation (Aust.) Pty. Ltd., Melbourne, Victoria (AU)

( * ) Notice: Subject to any disclaimer, the term of this patent is extended or adjusted under 35 U.S.C. 154(b) by 100 days.

(21) Appl. No.: 15/773,893

(22) PCT Filed: Nov. 4, 2016

(86) PCT No.: PCT/AU2016/051055
§ 371 (c)(1),
(2) Date: May 4, 2018

(87) PCT Pub. No.: WO2017/075668
PCT Pub. Date: May 11, 2017

(65) Prior Publication Data
US 2018/0321697 A1  Nov. 8, 2018

(30) Foreign Application Priority Data

Nov. 5, 2015  (AU) .................................. 2015904544
Dec. 22, 2015  (AU) .................................. 2015905339

(51) Int. Cl.
*G05D 23/13* (2006.01)
*G05D 23/02* (2006.01)
*F16K 11/044* (2006.01)

(52) U.S. Cl.
CPC ............ *G05D 23/02* (2013.01); *F16K 11/044* (2013.01); *G05D 23/13* (2013.01); *G05D 23/1346* (2013.01)

(58) Field of Classification Search
CPC ...... G05D 23/02; G05D 23/022; G05D 23/13; G05D 23/1306; G05D 23/132
See application file for complete search history.

(56) References Cited

U.S. PATENT DOCUMENTS 2,657,859 A * 11/1953 Von Wangenheim ....................... G05D 23/134 236/12.2
3,294,321 A * 12/1966 Couffer ................ G05D 23/126 236/99 R (Continued)

FOREIGN PATENT DOCUMENTS

CN  1886708 A  12/2006
EP  1094378 A1  8/2000

(Continued)

OTHER PUBLICATIONS

International Search Report of International Application No. PCT/AU2016/051055, filed Nov. 4 6, 2016, in the name of David P. Forrestal et al.

*Primary Examiner* — Jonathan Bradford
(74) *Attorney, Agent, or Firm* — Stetina Brunda Garred and Brucker

(57) ABSTRACT

A thermostatic mixing valve including: a first fluid inlet; a second fluid inlet; an outlet; a thermostatic element connected to a return spring and a piston such that movement of the thermostatic element assists with moving the piston, movement of the piston controlling fluid flow from the first fluid inlet and the second fluid inlet to the outlet; a housing containing an overtravel spring, the overtravel spring configured to resist a force applied by the thermostatic element (Continued)

during movement thereof; and a plunger extending into the housing, the plunger configured to engage the overtravel spring, wherein rotating the plunger adjusts the resistance applied onto the thermostatic element from the overtravel spring.

19 Claims, 3 Drawing Sheets

(56) References Cited

U.S. PATENT DOCUMENTS

| | | | |
|---|---|---|---|
| 3,685,728 | A | 8/1972 | Chapou |
| 4,846,219 | A * | 7/1989 | Schaefer .............. G05D 23/134 137/557 |
| 5,979,777 | A | 11/1999 | Ems |
| 7,392,955 | B1 * | 7/2008 | Laing .................... G05D 23/12 236/100 |
| 2011/0168927 | A1 | 7/2011 | Yuan |

FOREIGN PATENT DOCUMENTS

| | | |
|---|---|---|
| EP | 2775368 A2 | 2/2014 |
| FR | 2916033 A1 | 5/2005 |
| WO | 2006010880 A1 | 2/2006 |
| WO | 2006042656 A1 | 4/2006 |
| WO | 2013083704 A1 | 6/2013 |
| WO | WO2013083704 A1 | 6/2013 |
| WO | 2017075668 A1 | 5/2017 |

\* cited by examiner

THERMOSTATIC MIXING VALVE WITH DISINFECTING FACILITY

FIELD OF THE INVENTION

The invention relates to a thermostatic mixing valve and, in particular, to designs for improving the functionality of thermostatic mixing valves by incorporating thermal disinfecting means.

BACKGROUND TO THE INVENTION

Reference to background art herein is not to be construed as an admission that such art constitutes common general knowledge in Australia or elsewhere.

The fundamental purpose of thermostatic mixing valves is to:

Receive hot water

Receive cold water

Output relatively constant temperature water by regulating the flow rates of the hot and cold water coming into the valve.

There are many applications and industries that require these types of valves including sanitary water, heating and cooling, and industrial control. The mechanisms discussed are likely to be applied to other industries if shown to have commercial success. The vast majority of thermostatic mixing valves on the market utilise subtle variations of a particular design.

Normally, the spindle in a thermostatic mixing valve incorporates an overtravel mechanism that prevents the thermostatic element from becoming overloaded when subjected to high temperatures. This mechanism consists of an overtravel spring, preloaded to a force lower than the maximum load recommended by the element manufacturer but higher than the preload of the return spring, held captive by a retainer that the element also acts upon. When the thermostatic element is subjected to hot water it extends against the captive retainer and compresses the return spring, pushing the piston against the hot seat. If excessive temperatures are encountered the thermostatic element will act on the retainer and compress the overtravel spring rather than overloading the element which could potentially result in failure of the thermostatic element diaphragm which retains the thermostatic element's expansive medium in place.

To avoid colonization by harmful bacteria in the valves and fittings, they must be disinfected from time to time. One method is thermal disinfection. This requires the temperature of water passing into and through the valves to be increased to an elevated temperature (e.g. between 60° C. and 70° C.) for a period of time followed by return to normal operating temperature for such valves.

However, as the thermostatic mixing valves are designed to regulate the hot and cold water to produce a relatively constant temperature output, thermostatic valves are not readily able to reach the above elevated temperatures to effectively disinfect the valves.

OBJECT OF THE INVENTION

It is an aim of this invention to provide a thermostatic mixing valve which overcomes or ameliorates one or more of the disadvantages or problems described above, or which at least provides a useful alternative.

For example, an aim of the present invention is that, when actuated, hot water at a temperature high enough to kill *Legionella* bacteria, and other harmful water borne bacteria, is allowed to pass through the valve and associated downstream pipework thereby disinfecting the system.

Other preferred objects of the present invention will become apparent from the following description.

SUMMARY OF INVENTION

In one form, although not necessarily the only or broadest form, the invention resides in a thermostatic mixing valve including means for enabling flow of hot water through the valve to thereby disinfect, said thermostatic mixing valve including:

a spindle threadedly engaging a plunger which engages a turning or rotating means, and which also engages an overtravel spring the turning or rotating of the turning or rotating means in one direction leading to the decrease in force acting on the overtravel spring, thereby relaxing the overtravel spring, and allowing the return spring to force a thermostatic element and a piston within the valve to a position in which hot water can flow into the valve to thereby disinfect.

In another form, the invention resides in a thermostatic mixing valve including:

a first fluid inlet;

a second fluid inlet;

an outlet;

a thermostatic element connected to a return spring and a piston such that movement of the thermostatic element assists with moving the piston, movement of the piston controlling fluid flow from the first fluid inlet and the second fluid inlet to the outlet;

a housing containing an overtravel spring, the overtravel spring configured to resist a force applied by the thermostatic element during movement thereof; and a plunger extending into the housing, the plunger configured to engage the overtravel spring, wherein rotating the plunger adjusts the resistance applied onto the thermostatic element from the overtravel spring.

Preferably, in response to rotating the plunger in a first direction, a first portion of the plunger moves towards the thermostatic element.

Preferably, in response to rotating the plunger in a second direction, the first portion of the plunger moves away from the thermostatic element.

Preferably, the first portion of the plunger is configured to move from a first position to a second position.

Preferably, in the second position, substantially no resistance is applied onto the thermostatic element from the overtravel spring.

Preferably, the plunger includes a second portion.

Preferably, the first portion is threadingly coupled to the second portion.

Preferably, the first portion is configured to move through an aperture in the second portion. Preferably, the aperture includes a thread that engages with a threaded part of the first portion.

Preferably, in the first position, a first shoulder of the first portion engages with the second portion.

Preferably, in the first position, an end of the first portion is located substantially next to an end of the second portion.

Preferably, in the second position, the thermostatic element is able to move through the aperture of the second portion.

Preferably, the thermostatic mixing valve includes one or more associated mechanical stops to limit movement of the thermostatic element. Preferably, the one or more associated mechanical stops limit the maximum and minimum end travel of the thermostatic element.

Preferably, in the second position, the thermostatic element avoids engaging the first portion and no resistance is applied onto the thermostatic element from the overtravel spring.

Preferably, the first portion includes a socket portion.

Preferably, the first portion includes one or more recesses to receive a sealing ring therein.

Preferably, the second portion includes a base portion that engages with the overtravel spring.

Preferably, the second portion includes an upstanding portion that is configured to engage with the first shoulder of the first portion.

Preferably, the aperture extends through the base and upstanding portion.

Preferably, in the first position, the plunger sits substantially level with an upper face of the housing.

Preferably, in the second position, the plunger extends above an upper face of the housing.

Preferably, in the second position, a visual indicator is visible on the plunger.

Preferably, the second portion is retained in the housing with a clip.

Preferably, the plunger is located inboard of the retaining spring.

Preferably, the housing is connected to an intermediary body. Preferably, the housing is threadingly connected to the intermediary body.

Preferably, a first body in the form of a knob covers the housing and the plunger.

In a further form, the plunger is connected to the first body such that the first body may be turned to rotate the plunger.

Preferably, the first body is connected to a second body.

Preferably, the first body is connected to the second body by the intermediary body.

Preferably, the second body includes the first fluid inlet, the second fluid inlet, the outlet, the thermostatic element, the return spring and/or the piston.

In another form, the invention resides in a thermostatic mixing valve including:

a first fluid inlet;

a second fluid inlet;

an outlet;

a thermostatic element connected to a return spring and a piston such that movement of the thermostatic element assists with moving the piston, movement of the piston controlling fluid flow from the first fluid inlet and the second fluid inlet to the outlet;

a housing containing an overtravel spring, the overtravel spring configured to receive a force from the thermostatic element, a plunger extending into the housing, the plunger configured to apply a force on the overtravel spring, wherein the plunger is connected to a first body such that when the first body is moved away from the housing, the force on the overtravel spring is decreased.

Preferably, the first body covers the housing. Preferably, the first body is in the form of a knob.

Preferably, the plunger is configured to move from a first position in the housing to a second position in the housing.

Preferably, in the first position the overtravel spring is compressed.

Preferably, in the second position, the overtravel spring is at its free length. Preferably, in the second position, the plunger engages a top portion of the housing.

Preferably, the plunger threadingly engages the housing.

Preferably, the plunger is configured to provide the force on the overtravel spring from thereabove.

Preferably, a retainer is located at an end of the housing to retain the overtravel spring.

Preferably, the retainer is engaged by the thermostatic element. Preferably, the retainer is configured to move along the housing with the engagement of the thermostatic element.

Preferably, the housing is in the form of a spindle.

Preferably, the first body is connected to a second body. Preferably, the first body is connected to the second body by an intermediary body.

Preferably, the second body includes the first fluid inlet, the second fluid inlet, the outlet, the thermostatic element, the return spring and/or the piston.

Preferably, thermostatic mixing valve includes a visual indicator. Preferably, the visual indicator is exposed as the first body moves away from the housing.

In another form the invention resides in a method of elevating a temperature in a thermostatic mixing valve, the method including the steps of:

providing fluid to a first fluid inlet;

rotating a plunger extending into a housing in order to reduce the resistance applied by an overtravel spring onto a thermostatic element, the thermostatic element being connected to a piston; and allowing the piston to move in a direction that maintains the flow of fluid through the first fluid inlet.

Preferably, the step of rotating the plunger extending into the housing in order to reduce the resistance applied by the overtravel spring onto the thermostatic element includes engaging a tool with an upper portion of the plunger.

Preferably, the step of rotating the plunger extending into the housing in order to reduce the resistance applied by the overtravel spring onto the thermostatic element includes rotating a knob covering the housing.

In another form the invention resides in a method of elevating a temperature in a thermostatic mixing valve, the method including the steps of:

providing fluid to the thermostatic mixing valve;

moving a first body away from a housing in the thermostatic mixing valve to allow a piston to move towards the first body, the first body being connected to a plunger extending into the housing, wherein allowing the piston to move towards the first body assists in allowing the fluid to flow through the thermostatic mixing valve.

Preferably, the fluid is above approximately 60° C.

Preferably, the step of moving the first body away from the housing in the thermostatic mixing valve includes turning the first body.

Further features and advantages of the present invention will become apparent from the following detailed description.

BRIEF DESCRIPTION OF EMBODIMENTS OF THE INVENTION

By way of example, the present invention incorporates a means of removing the preload from the overtravel spring so that the combination force of the return spring, plus expansion of the thermostatic element responding to a higher temperature environment, is able to overcome it, thus allowing hot water to flow through the valve despite the thermostatic element being subjected to hot water. The mechanism is actuated by rotating the threaded plunger so as to allow the thread to bottom out or the overtravel spring reaches its free length. The height of the plunger when fully unscrewed is such that the knob that covers the adjustment mechanism cannot be properly reinstalled and a visual warning indicator is displayed, thereby ensuring that the valve is returned to its operational state once disinfection is achieved. To return the valve to its operational state the plunger is rotated until the thread disengages or meets a stopper.

In another form, the present invention incorporates a means for allowing the thermostatic element to extend without engaging a plunger that resists movement thereof with an overtravel spring. The mechanism is actuated by rotating the plunger, as further outlined below.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
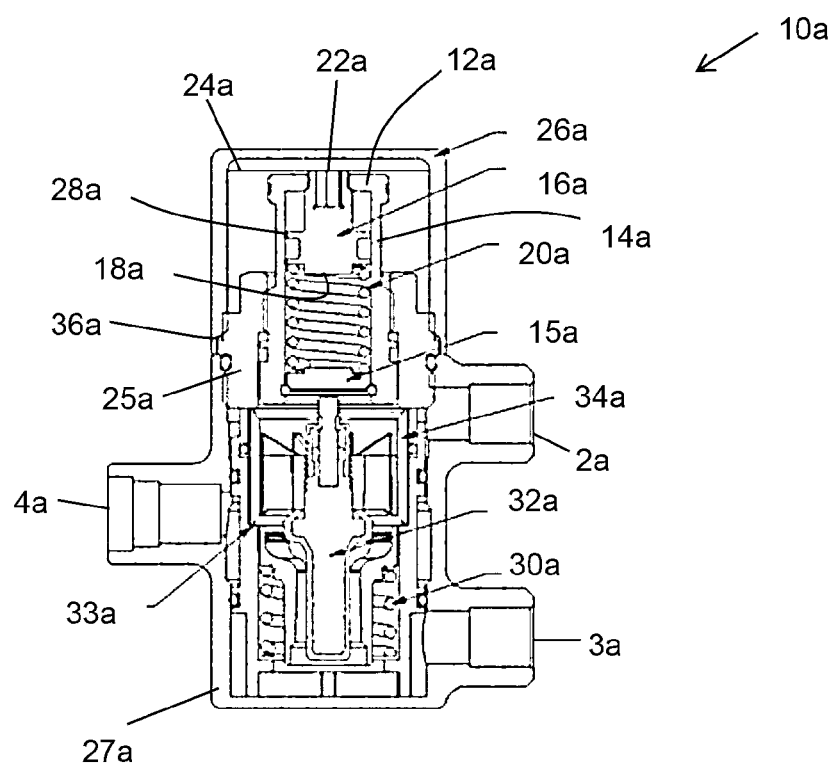
FIG. 1 is a sectional view through a thermostatic mixing valve, according to an embodiment of the invention, in the disinfection position.
Figure 2:
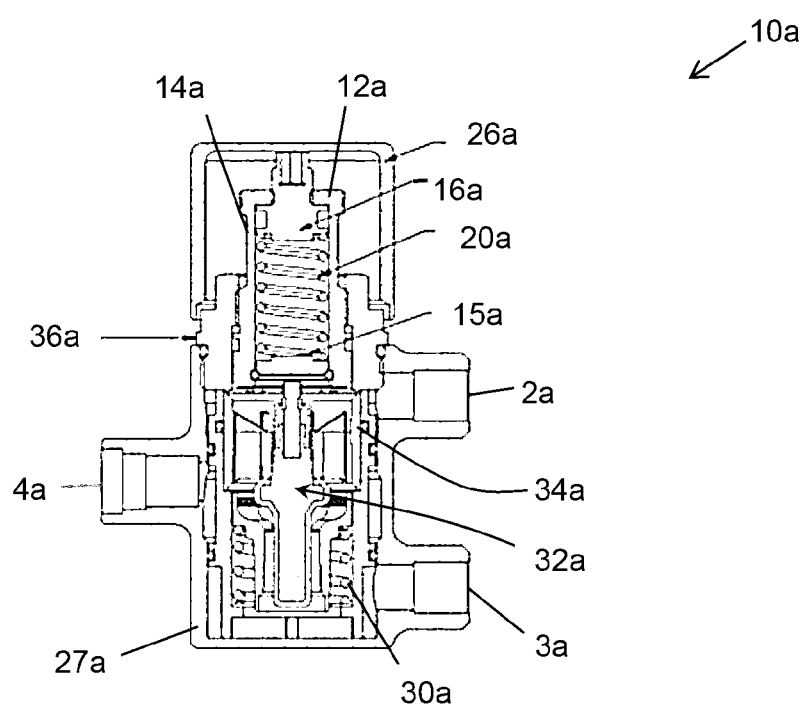
FIG. 2 is a sectional view of the embodiment of FIG. 1 in a normal operating position.

FIGS. 1 and 2 illustrate a thermostatic mixing valve 10a, in accordance with an embodiment of the present invention. The mixing valve 10a includes a first fluid inlet 2a, a second fluid inlet 3a and an outlet 4a. The first fluid inlet 2a, second fluid inlet 3a and outlet 4a are located below a first body in the form of knob 26a. The first fluid inlet 2a, second fluid inlet 3a and outlet 4a form part of a second body 27a. The knob 26a and second body 27a are connected through an intermediary body 25a.

The knob 26a encloses a housing that is located adjacent the intermediary body 25a and a plunger 16a. The housing in this embodiment is in the form of spindle 12a. The spindle 12a has a shaft 14a that is long enough to accommodate a plunger 16a and overtravel spring 20a therein. The spindle 12a retains at its upper end the plunger 16a. The plunger 16a interacts at its lower end 18a with overtravel spring 20a.

The upper end 22a of plunger 16a interacts with the inner upper surface 24a of knob 26a. That is, the plunger 16a is engaged with the inner upper surface 24a and is under the influence of overtravel spring 20a. The overtravel spring 20a is retained in the spindle 12a between the plunger 16a and a retainer 15a.

The length of the shaft 14a in the spindle 12a allows the overtravel spring 20a to extend to an unloaded length when the knob 26a is turned until either a thread 28a on the plunger 16a is wound out to its fullest extent or the overtravel spring 20a reaches its fully unloaded length. At that stage the force exerted by return spring 30a overcomes resistance exerted by the overtravel spring 20a, moving piston 34a (located adjacent hot set 33a) upwardly and allowing hot water to flow through the valve 10a even though the thermostatic element 32a is being subjected to higher temperature. This is shown in FIG. 2 and effects the desired disinfection of the valve.

The winding out of the knob 26a also uncovers a visual indicator 36a warning that disinfection is in progress. An alternate indicator may include a spring loaded indicator projecting outwardly of the valve body making it more apparent disinfection is occurring.

Turning the knob 26a in an opposite direction to the above pushes the plunger 16a downwardly and the thread 28a engages the corresponding thread on the spindle 12a. This leads to compression of the overtravel spring 20a so that the valve 10a returns to its normal operational state. This is shown in FIG. 1.

Figure 3:
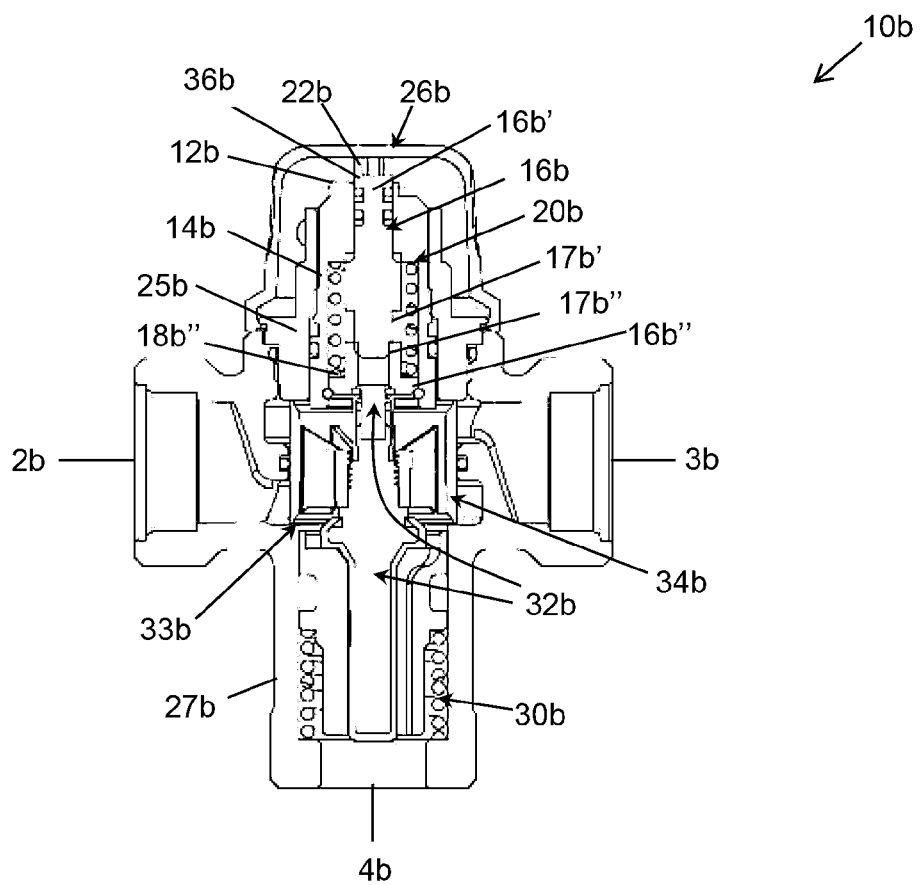
FIG. 3 is a sectional view of a thermostatic mixing valve, according to a further embodiment on the invention.

FIG. 3 illustrates a thermostatic mixing valve 10b, in accordance with a further embodiment of the present invention. The mixing valve 10b includes a first fluid inlet 2b, a second fluid inlet 3b and an outlet 4b.

With the above in mind, the use of a reference numeral followed by a lower case letter in this description typically indicates alternative embodiments of a general element identified by the reference numeral. Thus for example first fluid inlet 2a is similar to but not necessarily identical to first fluid inlet 2b. Further, references to an element identified only by the numeral refer to all embodiments of that element. Thus for example a reference to first fluid inlets 2 is intended to include both the first fluid inlet 2a and the second fluid inlet 2b.

The first fluid inlet 2b, second fluid inlet 3b and outlet 4b are located below a first body in the form of knob 26b. The first fluid inlet 2b, second fluid inlet 3b and outlet 4b form part of a second body 27b. The knob 26b and second body 27b are connected through an intermediary body 25b. In mixing valve 10b, the first fluid inlet 2b and the second fluid inlet 3b are substantially aligned. The outlet 4b is located below the first fluid inlet 2b and the second fluid inlet 3b. In this regard, the second body 27b is substantially in the form of a T-shape.

Similar to thermostatic mixing valve 10a, the knob 26b in the thermostatic mixing valve 10b encloses a housing in the form of a spindle 12b. The spindle 12b is threadingly connected to the intermediary body 25b. The spindle 12b includes a shaft 14b. The spindle 12b retains a plunger 16b and overtravel spring 20b therein. The plunger 16b extends into the overtravel spring 20b. With this in mind, the overtravel spring 20b is located outboard of the plunger 16b. The overtravel spring 20b engages with a shoulder in the spindle 12b.

The plunger 16b includes a first portion 16b' and a second portion 16b". The first portion 16b' includes a thread 17b'. The thread 17b' has a first shoulder located thereabove. The first portion 16b' includes an upper end 22b that includes a socket portion. The socket portion in this embodiment is in the form of a hex socket. Below the upper end 22b of the first portion 16b' are two recess portions including sealing rings therein. Below the upper end 22b of the first portion 16b' is also a second shoulder. A visual indicator 36b is located on the upper end 22b of the first portion 16b'.

The second portion 16b" includes an aperture therethrough. The aperture includes a thread 17b". The second portion 16b" includes a lower end 18b" that forms a base. An upstanding portion extends away from the lower end 18b". The overtravel spring 20b engages with the base and extends in a direction along the upstanding portion. The overtravel spring 20b is therefore configured to resist a force applied onto the plunger 16b, as outlined further below.

The thread 17b' of the first portion 16b' engages with the thread 17b" of the second portion 16b". In this regard, it would be appreciated that in response to rotating the first portion 16b' of the plunger 16b in a first direction, the first portion 16b' travels downward along the aperture towards the thermostatic element 32b. The first portion 16b' may be rotated by engaging a hex key with the socket portion. In a first position, the first shoulder of the first portion 16b' engages with the second portion 16b" such that the first portion 16b' is restricted from moving further towards the thermostatic element 32b.

In the first position, the thermostatic element 32b readily engages with the first portion 16b'. In response to hot fluid (i.e. fluid above approximately 60° C.) entering the first inlet 2b, the thermostatic element 32b begins to grow in a direction towards the upper end 22b, due to an increase in temperature. As the thermostatic element 32b engages the first portion 16b' (in the first position) and continues to grow in a direction towards the upper end 22b, due to an increase in temperature, the overtravel spring 20b is configured to resist the movement of the thermostatic element 32b. As a result of this resistance, the thermostatic element 32b is directed to move in a downward direction towards the outlet 4b (under the lower resistance of the return spring 30b). This in turn moves the piston 34b (located adjacent hot set 33b) in a downward direction such that the flow of hot fluid through the associated inlet 2b is further restricted.

To effect a desired disinfection of the valve 10b, the first portion 16b' of the plunger 16b is moved to a second position, as shown in FIG. 3. It would be appreciated that to move the first portion 16b' to the second position, the first portion 16b' is rotated in a second direction in order to move it away from the thermostatic element 32b. The knob 26b is removed to allow access to the first portion 16b'. The first portion 16b' moves away from the thermostatic element 32b until the second shoulder of the first portion 16b' engages with the spindle 12b.

With the first portion 16b' in the second position, the thermostatic element 32b is allowed to grow (or move) through the aperture in the second portion 16b". In this regard, the thermostatic element 32b does not engage the plunger 16b and, therefore, no resistance is provided via the overtravel spring 20b. Accordingly, the flow of hot fluid through the first fluid inlet 2b is not restricted by the piston 34b moving towards the outlet 4b. Thermal disinfection of the valve 10b and downstream therefrom may therefore occur. A user can identify when the valve 10b is undergoing thermal disinfection as the visual indicator 36b will be visible above the spindle 12b.

The mixing valves 10 provide a means to readily reach an elevated temperature, with the flow of hot fluid, to effectively disinfect the valves 10. In particular, the plungers 16 are easily rotated to adjust the resistance applied by the overtravel spring 20 onto the thermostatic element 32. Disinfecting the valves 10 in this manner avoids colonization of harmful bacteria in the valves 10 and downstream thereof.

The visual indicators 36 provide an indication to a user when the mixing valves 10 are in a disinfection state. This assists in increasing safety as the user is warned when the mixing valves 10 are not in a normal operating condition.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The claims defining the invention are as follows:

1. A thermostatic mixing valve including:
   a body comprising:
      a first fluid inlet;
      a second fluid inlet;
      an outlet; and
   a thermostatic element connected to a return spring and a piston such that movement of at least a part of the thermostatic element assists with moving the piston, movement of the piston controlling fluid flow from the first fluid inlet and the second fluid inlet to the outlet;
   an intermediary body connected to the body, the intermediary body configured to releaseably connect to a housing containing an overtravel spring, the overtravel spring configured to resist a force applied by the thermostatic element during movement thereof; and
   a plunger extending into the housing, the plunger configured to apply a force on the overtravel spring, the plunger having a first portion,
   wherein rotating the plunger adjusts the resistance applied onto the thermostatic element from the overtravel spring; and
   wherein the first portion of the plunger is configured to move from a first position to a second position where substantially no resistance is applied onto the thermostatic element from the overtravel spring.

2. The thermostatic mixing valve of claim 1, wherein in response to rotating the plunger in a first direction, the first portion of the plunger moves towards the thermostatic element.

3. The thermostatic mixing valve of claim 2, wherein in response to rotating the plunger in a second direction, the first portion of the plunger moves away from the thermostatic element.

4. The thermostatic mixing valve of claim 1, wherein a visual indicator is visible on the plunger in the second position.

5. The thermostatic mixing valve of claim 1, wherein the plunger includes a second portion that is threadingly coupled to the first portion.

6. The thermostatic mixing valve of claim 5, wherein in the second position, the thermostatic element is able to move through an aperture of the second portion.

7. The thermostatic mixing valve of claim 1, wherein the housing is threadingly connected to the intermediary body.

8. The thermostatic mixing valve of claim 1, wherein a first body in the form of a knob covers the housing and the plunger.

9. The thermostatic mixing valve of claim 8, wherein the plunger is connected to the first body such that the first body may be turned to rotate the plunger.

10. A thermostatic mixing valve including:
a body comprising:
a first fluid inlet;
a second fluid inlet;
an outlet; and
a thermostatic element connected to a return spring and a piston such that movement of at least a part of the thermostatic element assists with moving the piston, movement of the piston controlling fluid flow from the first fluid inlet and the second fluid inlet to the outlet;
an intermediary body connected to the body, the intermediary body being releaseably connected to a housing containing an overtravel spring, the overtravel spring configured to resist a force from the thermostatic element,
a plunger extending into the housing, the plunger configured to apply a force on the overtravel spring, the plunger having a first portion,
wherein the plunger is connected to a first body such that when the first body is moved away from the housing, the force on the overtravel spring is decreased; and
wherein the first portion of the plunger is configured to move from a first position to a second position where substantially no resistance is applied onto the thermostatic element from the overtravel spring.

11. The thermostatic mixing valve of claim 10, wherein the first body covers the housing.

12. The thermostatic mixing valve of claim 10, wherein the plunger threadingly engages the housing.

13. The thermostatic mixing valve of claim 10, wherein the thermostatic mixing valve includes a visual indicator that is exposed as the first body moves away from the housing.

14. A method of elevating a temperature in a thermostatic mixing valve, the method including the steps of:
providing fluid to a first fluid inlet of a body;
rotating a plunger extending into a housing in order to reduce the resistance applied by an overtravel spring onto a thermostatic element, the thermostatic element being connected to a piston and the housing being releaseably connected to an intermediary body that is attached to the body; and
the reduced resistance on the thermostatic element allowing the piston to move in a direction that maintains the flow of fluid through the first fluid inlet, the plunger having a first portion that is configured to move from a first position to a second position where substantially no resistance is applied onto the thermostatic element from the overtravel spring.

15. The method of claim 14, wherein the step of rotating the plunger extending into the housing in order to reduce the resistance applied by the overtravel spring onto the thermostatic element includes engaging a tool with an upper portion of the plunger.

16. The method of claim 14, wherein the step of rotating the plunger extending into the housing in order to reduce the resistance applied by the overtravel spring onto the thermostatic element includes rotating a knob covering the housing.

17. The method of claim 14, wherein the step of rotating the plunger includes rotating a first body such that when the first body is rotated away from the housing, the force on the overtravel spring is decreased.

18. The method of claim 17, wherein the step of rotation the first body away from the housing includes exposing a visual indicator.

19. The method of claim 14, wherein the fluid is above approximately 60° C.

* * * * *